March 18, 1924.
W. D. BREWSTER
CAR BRAKE OPERATING MECHANISM
Filed Aug. 4, 1923
1,487,532
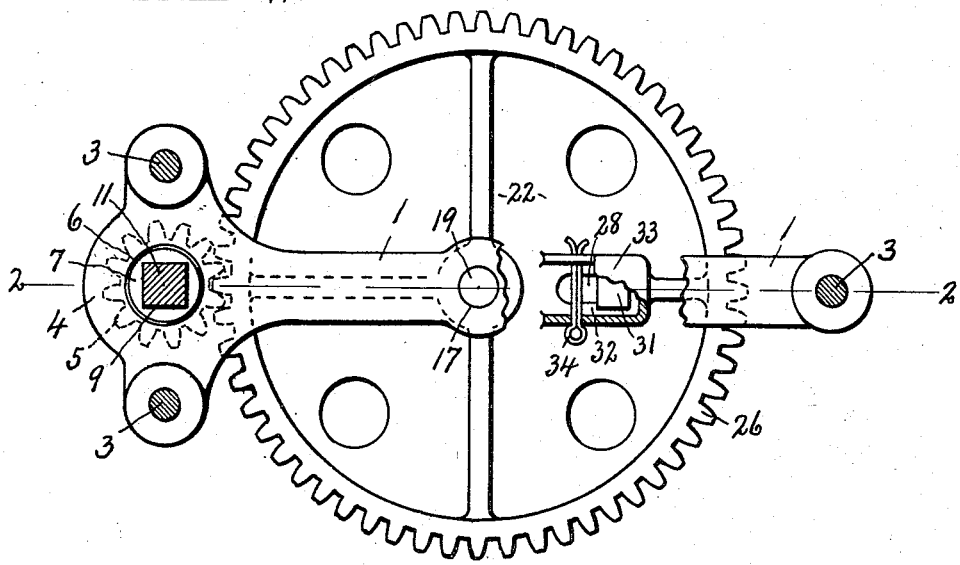
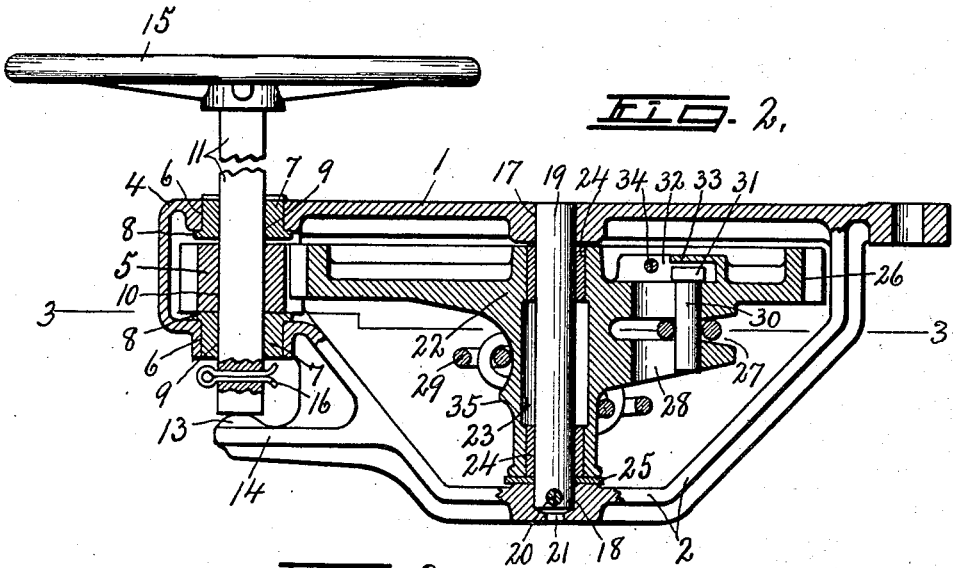
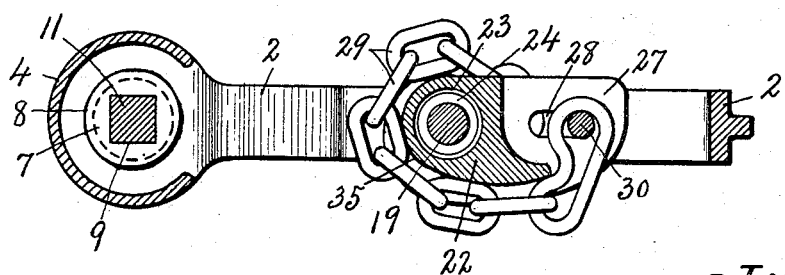
INVENTOR
W. D. Brewster
BY Howard P. Denison
ATTORNEY Patented Mar. 18, 1924.

1,487,532

UNITED STATES PATENT OFFICE.

WILLIAM D. BREWSTER, OF SYRACUSE, NEW YORK, ASSIGNOR TO NATIONAL BRAKE COMPANY, INC., OF BUFFALO, NEW YORK, A CORPORATION OF NEW YORK.

CAR-BRAKE-OPERATING MECHANISM.

Application filed August 4, 1923. Serial No. 655,712.

*To all whom it may concern:*

Be it known that I, WILLIAM D. BREWSTER, a citizen of the United States of America, of Syracuse, in the county of Onondaga, in the State of New York, have invented new and useful Improvements in Car-Brake-Operating Mechanism, of which the following, taken in connection with the accompanying drawings, is a full, clear, and exact description.

This invention relates to car brake operating mechanism of the class set forth in my Patent Number 1,144,104 February 6, 1923 except that the main object of the present invention is to make the vertical operating staff of the same angular cross section and size from end to end so that it may be cut to the desired length from stock bars and inserted axially through corresponding angular openings in the driving pinion and in suitable rotary bushings which are journaled in the frame at opposite ends of the pinion thereby avoiding the expensive forging and machining of the staff, retaining its full strength throughout its length and permitting it to be more easily and quickly assembled than would be possible with a staff having portions thereof round and other portions angular in cross section.

Another object is to provide an end thrust bearing for the lower end of the staff as a part of the main supporting frame for supporting the weight of the shaft against downward displacement independently of the pinion thereby leaving the latter free to rotate with a minimum amount of friction and also affording a basis for measurement of the height of the shaft independently of the pinion for supporting the hand wheel at the desired height.

Other objects and uses relating to specific parts of the device will be brought out in the following description.

In the drawings:

Figure 1 is a top plan, partly broken away and partly in section, of a car brake operating mechanism embodying the various features of my invention, the upper portion of the staff and brake wheel being omitted.

Figure 2 is a vertical sectional view taken in the plane of line 2—2, Figure 1, showing the brake staff, as partly broken away, and the operating wheel on the upper end of the staff.

Figure 3 is a horizontal sectional view taken in the plane of line 3—3, Figure 2.

As illustrated, the main supporting frame comprises an elongated T-shaped plate —1— and an underlying substantially U-shaped brace bar —2— having its ends integrally united to the corresponding ends of the top plate and its intermediate portion in spaced relation thereto, the smaller end of the top plate and opposite arms of the head being provided with bolt openings for receiving bolts —3— by which the frame may be rigidly secured to the under side of the platform or other part of a car in a suitable position for attaching the brake operating cable to the brake beam not shown.

The head as —4—, of the top plate —1— and underlying end of the brace bar —2— are arranged in vertically spaced relation for receiving a pinion —5— and are provided with vertically alined similar journal openings —6— for receiving a pair of similar journal sleeves, —7— of bronze or other suitable metal capable of resisting to a maximum degree, the strains and wear to which they are subjected.

The sleeves —7— are of less vertical height than the distance between the adjacent portions of the top plate —1— and brace bar —2— to permit them to be inserted from either side into said space and thence to their respective journal bearings —6—, the inner or adjacent ends of said sleeves being provided with annular flanges —8— of relatively larger diameter than their respective openings —6— to prevent their outward displacement.

That is, the sleeves —7— are rotatably mounted in their respective openings —6— at opposite ends of the pinion —7— which substantially fills the intervening space and serves to hold the sleeves against inward displacement.

The sleeve —7— and pinion —5— are provided with similar vertically registering openings —9— and —10— of angular, in this instance square, cross section for receiving a vertical staff or shaft —11— of similar angular, in this instance square, cross section.

The staff —11— is of the same size and cross sectional form from end to end and therefore may be cut to the desired length from stock bars and when adjusted for use is inserted from the top downwardly through the registering openings —9— and —10— in the sleeves —7— and pinion —5— and has its lower end resting upon a rounded or convex end thrust bearing —13— which is formed upon an extension —14— of the adjacent side of the brace bar —2— for limiting the downward movement of the staff and affording a convenient end thrust bearing therefor, so that the staff may be rotated freely with a minimum amount of frictional resistance.

A suitable hand wheel —15— may be secured to the upper end of the staff —1— at any desired height most convenient for operation either from the platform bumper beams or from the top of the car depending upon the class of car with which the brake operating mechanism is to be used.

The bearing —13— is spaced apart from the lower end of the lower sleeve —8— while the lower end of the staff —11— extends across the intervening space and is provided with a cotter key —16— or equivalent stop for upward displacement of the staff.

The intermediate portion of the plate —1— is provided with a vertical opening —17— in vertical alinement with a socket —18— in the underlying portion of the brace bar —2— for receiving and supporting a vertical shaft —19— which extends across the intervening space between the top plate —1— and central portion of the brace bar —2— and has its lower end seated in the socket —18— and secured therein by a pin —20—, the lower wall of said socket being provided with a reduced central aperture —21— to permit the passage of any foreign matter which may lodge in the socket therethrough.

A drum —22— is journaled upon the shaft —19— to revolve in the space between the top plate —1— and brace bar —2— and has its central portion provided with an internal oil chamber —23— closed at both ends by similar bushings —24— in corresponding ends of the drum and engaged with the shaft —19— for rotatably supporting said drum coaxially with and upon said shaft.

A hardened washer —25— is interposed between the lower end of the drum —22— and adjacent portion of the brace bar —2— to form an end thrust bearing for said drum and to permit the same to rotate freely with a minimum amount of friction, the axial length of the hub of the drum being substantially equal to the distance between the end thrust bearing —25— and underside of the top plate —1— for limiting endwise movement of said drum.

This drum is provided with peripheral gear teeth —26— meshing with the pinion —5— for receiving rotary motion therefrom and is also provided with one side preferably below the gear with intersecting radial and axially extending sockets —27— and —28—, the radial sockets serving to receive one of the links of a chain or cable —29— while the vertical slot serves to receive a locking pin —30—, adapted to pass through the link in the slot —27— for attaching the chain to the drum.

The slots —27— and —28— are elongated radially to permit the bolt —30— and link of the chain —29— to have a limited radial movement, the bolt being provided with a head —31— which is slidable in a radial slot —32— in the upper portion of the drum and forming an enlargement of the upper end of the slot —28—.

The outer end of the slot —32— is covered by a ledge —33— overhanging the head of the bolt when the latter is moved to its outward position to prevent withdrawal of said bolt from the slot —28—.

A counter key or pin —34— is inserted through registering openings in opposite walls of the slot —32— across the inner face of the head —31— of the bolt to limit the inward movement of the bolt when the chain is attached to the drum for use.

It will be noted, however, that by removing the key or pin —34—, the bolt —30— may be moved inwardly from under the ledge —33— and then withdrawn upwardly when it is desired to detach or reattach the chain therefrom or thereto.

When the bolt —30— with the chain attached thereto is adjusted for use, it is disposed some distance from the axis of revolution of the drum, the object of which is to take up the slack of the chain quickly when the drum is rotated for applying the brakes during which time, the adjacent portions of the chain are wound upon an underlying conical portion —35— of said drum so that as the winding continues, the power applied to the application of the brakes increases and this power is further increased by making the diameter of the pinion —5— relatively small as compared with that of the gear —26—.

What I claim is:

1. In a car brake operating mechanism, a main supporting frame, a drum journaled on the frame, means for rotating the drum including a vertical operating staff of the same angular cross section and size from end to end, and a driving pinion on said staff, said frame being provided with an end thrust bearing engaging the lower end of the staff.

2. In a car brake operating mechanism, a main supporting frame, a drum journaled in the frame, means for rotating the drum including a vertical operating staff of the same angular cross section and size from end to end, a driving pinion on said staff in combination with bushings mounted upon the staff and engaged in journal bearings on the frame at opposite ends of the pinion.

3. In a car brake operating mechanism, a main supporting frame, a drum journaled in the frame, means for rotating the drum including a pinion having an axial opening of angular cross section therethrough, an operating staff having an angular portion extending through the angular opening of the pinion in combination with bushings journaled in the frame at opposite ends of the pinion and provided with axial openings of angular cross section for receiving the angular portion of the staff.

4. In a car brake operating mechanism, a main supporting frame, a drum journaled in the frame, means for rotating the drum including a vertical operating shaft, and a pinion splined on the staff to rotate therewith, and to permit the staff to be withdrawn endwise from the pinion in combination with bushings journaled in the frame at opposite ends of the pinion and splined upon the staff to rotate therewith and to permit said staff to be withdrawn endwise from the bushings.

In witness whereof I have hereunto set my hand this 20th day of July 1923.

WILLIAM D. BREWSTER.

Witnesses:
H. E. CHASE,
RITA CAMPOLIETO.